US010771183B2

(12) United States Patent
Clouet

(10) Patent No.: US 10,771,183 B2
(45) Date of Patent: Sep. 8, 2020

(54) OPTICAL NETWORK ELEMENT FOR TRANSMITTING AND/OR RECEIVING WDM SIGNALS

(71) Applicant: Xieon Networks S.a.r.l., Senningerberg (LU)

(72) Inventor: Benoit Clouet, Munich (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/063,053

(22) PCT Filed: Dec. 20, 2016

(86) PCT No.: PCT/EP2016/081864
§ 371 (c)(1),
(2) Date: Jun. 15, 2018

(87) PCT Pub. No.: WO2017/108753
PCT Pub. Date: Jun. 29, 2017

(65) Prior Publication Data
US 2018/0375606 A1 Dec. 27, 2018

(30) Foreign Application Priority Data
Dec. 22, 2015 (EP) ..................... 15201828

(51) Int. Cl.
*H04J 14/02* (2006.01)
*H04Q 11/00* (2006.01)
(52) U.S. Cl.
CPC ...... *H04J 14/0291* (2013.01); *H04J 14/0212* (2013.01); *H04Q 11/0005* (2013.01)
(58) Field of Classification Search
None
See application file for complete search history.

(56) References Cited

U.S. PATENT DOCUMENTS 5,793,745 A * 8/1998 Manchester ............ H04J 3/085
370/224
2010/0150558 A1 6/2010 Wisseman
(Continued)

FOREIGN PATENT DOCUMENTS

CN 101640818 A 2/2010
EP 2493101 A1 8/2012

OTHER PUBLICATIONS

Okamoto et al., "Network Architecture for Optical Path Transport Networks", Aug. 1997, IEEE Transactions on Communications, vol. 45, No. 8, pp. 968-977 (Year: 1997).*
(Continued)

*Primary Examiner* — David W Lambert

(57) ABSTRACT

The present invention relates to an optical network element (30, 34) comprising a wavelength selective switch, WSS, (432, 136) with one or more input ports, a working output port (38) and a separate protecting output port (40), the WSS (432) being configurable to a working configuration, in which one or more channels are routed from said one or more input ports to the working output port (38), and being configurable to a protecting configuration, in which said one or more channels or a subset thereof are routed from said one or more input ports to the protecting output port (40), or with a working input port (42) and a protecting input port (44) and with one or more output ports, the WSS (136) being configurable to a working configuration, in which one or more channels are routed from the working input (42) port to the one or more output ports, and being configurable to a protecting configuration, in which one or more channels are routed from the protecting input port (44) to the one or more output ports, a computer readable medium including program code defining configuration information, a control unit configured to control the WSS (432, 136) to adopt the
(Continued)

working configuration or the protecting configuration based on the predefined configuration information.

20 Claims, 6 Drawing Sheets

(56) References Cited

U.S. PATENT DOCUMENTS

2010/0221004 A1* 9/2010 Haslam ............... H04J 14/0201
398/49
2012/0087658 A1  4/2012 Jander
2012/0248287 A1  10/2012 Shukunami

OTHER PUBLICATIONS

International Search Report and Written Opinion, PCT/EP2016/081864, dated Mar. 16, 2017, 17 pages.
Neilson, D. et al., "Wavelength selective switching for Optical Bandwidth Management," Bell Labs Technical Journal, vol. 11(2):105-128 (2006) XP011627567,ISSN: 1089-7089, DOI: 10.1002/BLTJ.20164 [retrieved on Mar. 15, 2014].
Okamoto, S. et al., "Network Architecture for Optical Path Transport Networks," IEEE Transactions on Communications, IEEE Service Center, vol. 45(8): 968-977(1997), XP011008998, ISSN: 0090-6778 [retrieved on Mar. 15, 2014].

* cited by examiner

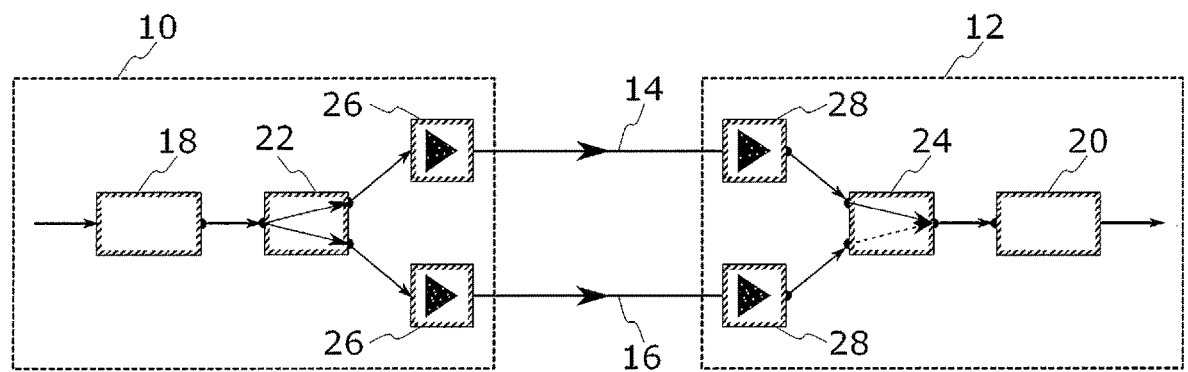
Fig. 1 (State of the Art)
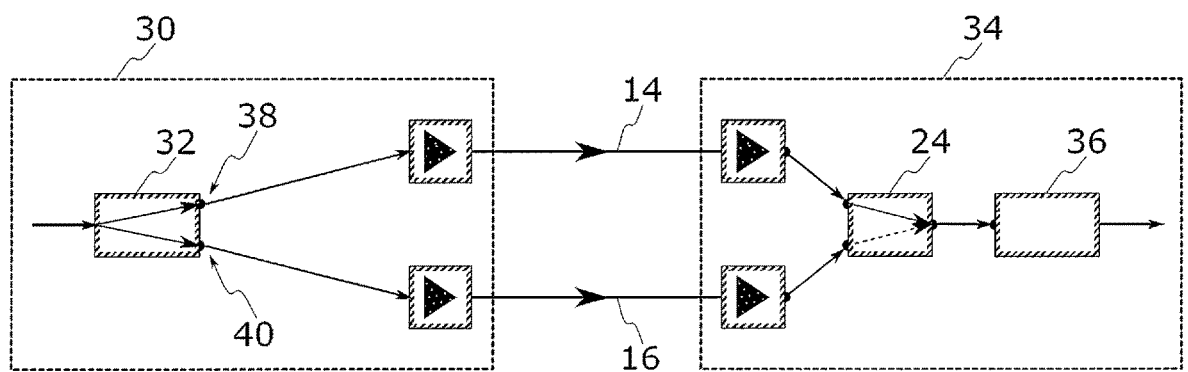
Fig. 2a

OPTICAL NETWORK ELEMENT FOR TRANSMITTING AND/OR RECEIVING WDM SIGNALS

This application is a 35 U.S.C. 371 national stage filing of International Application No. PCT/EP2016/081864, filed on Dec. 20, 2016, which claims priority to European Patent Application No. 15201828.9, filed on Dec. 22, 2015. The entire contents of these applications are incorporated herein by reference in their entirety.

TECHNICAL FIELD

The present invention relates to protection in optical WDM networks, in particular to an optical network element for transmitting and/or receiving WDM signals, an optical network for transmitting WDM signals and a method for transmitting WDM signals.

BACKGROUND

Typical wavelength division multiplex (WDM) networks comprise a number of nodes, which are interconnected and transmit and receive WDM signals. Typically, the nodes comprise reconfigurable optical add-drop multiplexers (ROADM) for adding additional signals on available channels to a WDM signal and/or for dropping WDM signals from particular channels of received WDM signals in the nodes. A channel designates a wavelength or wavelength range which is used for signal transmission with WDM signals.

In order to maintain the communication in case of a failure, such as in case of a break of a fiber connection, or in case of downtime due to maintenance, common WDM networks use protection paths which can be used alternatively for the transmission instead of working paths.

FIG. 1 shows a conventional WDM network comprising a first ROADM 10 of a first node and a second ROADM 12 of a second node. The first node and the second node are connected via a working path 14 and a protecting path 16, wherein in the WDM network identical WDM signals are transmitted via the working path 14 and the protecting path 16 from the first node to the second node.

The first ROADM 10 comprises a first wavelength selective switch (WSS) 18 for multiplexing and the second ROADM 12 comprises a second WSS 20 for de-multiplexing. The first ROADM 10 further comprises an optical splitter 22, which receives a multiplexed WDM signal provided by the first WSS 18. For simplicity only one input signal is shown for the first WSS 18. However, the WSS 18 may receive plural WDM signals at separate ports which can be multiplexed to provide a single multiplexed WDM signal. This multiplexed WDM signal is provided to the optical splitter 22. In the optical splitter 22 the incoming multiplexed WDM signal is split into two identical WDM signals carrying the same information, wherein one of these WDM signals is transmitted via the working path 14 towards the second node and the other WDM signal is transmitted via the protecting path 16 towards the second node.

The second ROADM 12 of the second node further comprises an optical switch 24 with two input ports and an output port. One of the input ports is connected to the working path 14 and the other input port is connected to the protecting path 16. The output port is connected to the second WSS 20. In case of normal operation, when no failure is present in the working path 14 and no maintenance is performed in the working path 14, the optical switch 24 only forwards the WDM signal being received from the working path 14 to the second WSS 20. The the WDM signal arriving via the protecting path 16 is not forwarded to the second WSS 20.

In case of a failure in the working path 14 the transmission via the working path 14 is interrupted and the optical switch 24 is switched to a protecting position in which the WDM signal arriving via the protecting path 16 is forwarded to the second WSS 20. When the failure is fixed and the transmission via the working path 14 resumed, the optical switch 24 can be switched back to a working position. The multiplexed WDM signal which is received at the second WSS 20 is de-multiplexed into separated WDM signals being output at separate ports of the second WSS 20. For simplicity only one of these de-multiplexed WDM signals, which are output at the second WSS 20, is shown in FIG. 1.

Both the working path 14 and the protecting path 16 can correspond to a single optical fiber or to other optical multiplex sections (OMS), which may comprise additional and/or alternative components. In the network of FIG. 1 each of the working path 14 and the protecting path 16 comprises an optical fiber, a booster 26 and a pre-amplifier 28, for example.

SUMMARY OF THE INVENTION

The problem to be solved by the present invention is to provide an optical network element, an optical network and a method which allow for more efficient path protection in optical WDM networks. This problem is solved by the independent claims. Preferred embodiments are defined in the dependent claims.

The present invention relates to an optical network element for transmitting and/or receiving WDM signals. The optical network comprises a wavelength selective switch (WSS). According to a first alternative, the WS S has one or more input ports and a working output port and a separate protecting output port, wherein the WSS is configurable to a working configuration, in which one or more channels are routed from said one or more input ports to the working output port, and is configurable to a protecting configuration, in which said one or more channels or a subset thereof are routed from said one or more input ports to the protecting output port. According to a second alternative, the WSS has a working input port and a protecting input port and one or more output ports, wherein the WSS is configurable to a working configuration, in which one or more channels are routed from the working input port to the one or more output ports, and is configurable to a protecting configuration, in which one or more channels are routed from the protecting input port to the one or more output ports. According to both alternatives the optical network element further comprises a computer readable medium including program code defining configuration information and a control unit configured to control the WSS to adopt the working configuration or the protecting configuration based on the predefined configuration information.

While the optical network element according to the first alternative can be connected to inputs of a working path and a protecting path, the optical network element according to the second alternative can be connected to the outputs of a working path and a protecting path. In both alternatives the WSS has two different configurations, namely a working configuration and a protecting configuration, wherein the configuration information for controlling the respective configuration is already present or predefined. Hence, in case the optical network element is implemented in an optical network and connected to a working path, the optical network element can be controlled according to the predefined configuration information. Therefore, it is possible to switch the WSS from the working configuration to the protecting configuration, in case the working path is interrupted or for any other reason not in operation. In this case the optical network element according to the first alternative is able to transmit the one or more channels, which have been sent via the working path, via the protecting path instead. The optical network element according to the second alternative can forward the one or more channels arriving via the protecting path, which are the same one or more channels which had been arriving via the working path before a transmission via the working was interrupted. In both alternatives this switching of channels for selecting either the working path or the protecting path can be performed by the WSS itself without need for an additional implementation of an optical switch optical switch. The function of this optical switch can be taken over by the WSS which may be further used for multiplexing and de-multiplexing purposes. Accordingly, the optical network element allows for providing path protection in WDM networks with less system components, wherein the WSS is capable to take over the function of an optical switch for selecting between a working path and a protecting path. This is less costly and more efficient.

Although common WSS may be configured to output WDM signals or components thereof at desired output ports, they are usually not configured or pre-configured to switch between two different specific configurations based on predefined information which is present in case of a protection event, wherein in both configurations identical channels are routed to different output ports (first alternative) or are routed or selected from different input ports (second alternative).

With respect to a configuration of a WSS "routing of a channel" does not designate the activity of transmitting the channel via a corresponding path but designates the property of the WSS in this configuration of being configured to transmit the channel via a corresponding path, irrespective of the actual presence of a signal.

The present invention further relates to an optical network for transmitting WDM signals. The optical network comprises a first node with a first wavelength selective switch (WSS) and a second node with a second WSS, wherein the first WSS and the second WSS are connected via a working path and via a protecting path. According to a first alternative of the optical network, the working path is connected to a working output port of the first WSS and the protecting path is connected to a separate protecting output port of the first WSS, wherein the first WSS is configured to broadcast one or more channels or a subset thereof of one or more WDM signals from one or more input ports of the first WSS to both the working output port and the protecting output port. According to a second alternative of the optical network, the working path is connected to a working output port of the first WSS and the protecting path is connected to a separate protecting output port of the first WSS, wherein the first WSS is configurable to a working configuration, in which one or more channels are routed from one or more input ports of the first WSS to the working output port of the first WSS, and is configurable to a protecting configuration, in which said one or more channels or a subset thereof are routed from said one or more input ports of the first WSS to the protecting output port of the first WSS. According to the second alternative, the optical network further comprises a computer readable medium including program code defining configuration information and a control unit configured to control the first WSS to adopt the working configuration or the protecting configuration based on the predefined configuration information. According to a third alternative of the optical network, the working path is connected to a working input port of the second WSS and the protecting path is connected to a separate protecting input port of the second WSS, wherein the second WSS is configurable to a working configuration, in which one or more channels are routed from the working input port to one or more output ports of the second WSS, and is configurable to a protecting configuration, in which said one or more channels or a subset thereof are routed from the protecting input port to the said one or more output ports of the second WSS. According to the third alternative, the optical network further comprises a computer readable medium including program code defining configuration information and a control unit configured to control the second WSS to adopt the working configuration or the protecting configuration based on the predefined configuration information.

While according to the first alternative, the first WSS in the first node includes a broadcasting function allowing for replacing a splitter behind the first WSS, according to the second alternative the first WSS in the first node includes a switching function allowing for replacing an optical switch behind the first WSS. Since both functions allow replacing a corresponding additional component, the network can be implemented with fewer components. This provides for a more efficient and less costly path protection in optical WDM networks.

Each of the first, second and third alternatives of the optical network may be provided without any other of the first, second and third alternatives. Hence, it is not necessary that both the first WSS and the second WSS take over the function of an additional optical switch or splitter. The advantage of the present invention is already provided, if only one of the first and second WSS takes over the function of an additional optical splitter or optical switch and thereby replaces this component.

Further, each of the first and second alternatives can be combined with the third alternative, respectively, without the other of the first and second alternatives. In this case, more additional components can be replaced, allowing for a further increase of efficiency and for a further cost reduction.

The first WSS according to the first alternative and the second WSS according to the third alternative of the optical network are similar to the before-mentioned WSS of the optical network element but with the difference that the computer-readable medium and the control unit configured to control the first or second WSS, respectively, must not be comprised in the first node or the second node. The computer-readable medium and/or the control unit can be provided within the network outside the respective node, instead.

The before-mentioned connection between the first WSS and the second WSS via the working path and via the protecting path can be a direct optical connection, for example a direct fiber optical connection, or an indirect connection over additional components, such as nodes or ROADMs.

According to an embodiment of the optical network element or of the optical network, the one or more channels which are routed in the protecting configuration from the protecting input port of one of said WSS to one or more output ports of the same WSS or which are routed in the protecting configuration to the protecting output port of one of said WSS from one or more input ports of the same WSS are a subset of the channels which are routed in the working configuration from the working input port this WSS to one or more output ports of this WSS or which are routed in the working configuration to the working output port of this WSS from one or more input ports of this WSS. Accordingly, the use of a WSS provides the advantage that not all channels which are used for signal transmission via the working path need to be protected by the transmission via the protecting path. Instead, only a subset of the channels which are used for the working path can be protected. Hence, it is possible to use a protecting path with a lower bandwidth or to use the protecting path for a shared protection of more than one subset of channels, which are used for signal transmission via different working paths. Accordingly, plural working paths can be protected by a common shared protecting path. This is not possible, if an optical splitter is implemented behind the first WSS is used for broadcasting in the first node, since an optical splitter is not wavelength selective and is not capable of providing two output signals with corresponding sets of channels, one of which wherein being a subset of the other. The same applies for an optical switch, which is not wavelength selective either and does not allow for a protection of a subset of channels only.

According to a further embodiment of the optical network element or of the optical network, when being in the working configuration the respective WSS is configured to prohibit a routing of a channel from its protecting input port to its one or more output ports or to its protecting output port from its one or more input ports and/or when being in the protecting configuration the respective WSS is configured to prohibit a routing of a channel from its working input port to its one or more output ports or to its working output port from its one or more input ports. Accordingly, in each of the working configuration and the protecting configuration it can be ensured that only a desired path is used for transmission while the other path is not used for transmission or the WDM signal transmitted via the other path is not forwarded. This prevents a simultaneous forwarding of both the WDM signals from the working path and the protection path by the second WSS.

According to one or more embodiments of the optical network element or of the optical network at least one of the optical network element, the first node and the second node is a reconfigurable optical add-drop multiplexer (ROADM) or comprises a ROADM and/or wherein the second node is an optical add-drop multiplexer (OADM) or comprises an OADM.

According to one or more embodiments of the optical network element or of the optical network at least one of the WSS, the first WSS and the second WSS comprises a switching element based on Liquid Crystal on Silicon (LCoS), Liquid Crystal (LC) or Microelectromechanical Mirrors (MEMS).

According to one or more embodiments of the optical network element or of the optical network at least one of the WSS, the first WSS and the second WSS comprises a reconfigurable phase array, which is preferably based on Liquid Crystal on Silicon (LCoS) or Liquid Crystal (LC). A reconfigurable phase array can be used as switching element and can correspond to a diffractive element, which allows for directing an impinging channel or wavelength simultaneously to different directions and hence to different output ports of the WSS. Hence, the phase array can be used to provide the broadcasting capability, wherein different directions correspond to different orders of diffraction. The reconfigurable phase array may be the same element which is used for the conventional switching within a WSS of a ROADM to provide the reconfigurable routing or directing of individual channels to respectively desired output ports.

According to one or more embodiments of the optical network element or of the optical network the WSS, the first WSS and/or the second WSS does not comprise an additional optical splitter and/or does not comprise an additional optical switch. This allows to save costs and to provide a more efficient protection, "Additional optical splitter" means in addition to a dispersive and/or diffractive element required for multiplexing and/or de-multiplexing in a WSS. "Additional optical switch" means in addition to an internal WSS switching element, such as a switching element based on LCoS, based on LC or based on MEMS, required for providing or changing a routing of channels in a WSS.

According to one or more embodiments of the optical network element or of the optical network the WSS and/or the first WSS is a N×M WSS with N≥1 and M≥2 and/or the WSS and/or the second WSS is a K×L WSS with K≥2 and L≥1. The number of ports can in particular depend on the number of additional WSS which may be provided in the same node. If no or a smaller number of additional WSS are provided in the same node, the respective WSS may comprise a larger number of input and/or output ports in order to be able to receive and/or transmit a comparable number separate WDM signals.

Further, one or more of the before-mentioned WSS may be contentionless, i.e. capable of switching different channels independently from each other to different desired ports and directions.

The present invention further relates to a method for transmitting WDM signals in an optical network, the optical network comprising a first node with a first wavelength selective switch (WSS), a second node with a second WSS, wherein the first WSS and the second WSS are connected via a working path and via a protecting path. According to a first alternative, the method comprises by using the first WSS, broadcasting one or more channels or a subset thereof of one or more WDM signals from one or more input ports of the first WSS to a working output port of the first WSS and to a separate protecting output port of the first WSS, wherein the working path is connected to said working output port and the protecting path is connected to said protecting output port. According to a second alternative, the method comprises by using the first WSS, switching from a working configuration, in which one or more channels are routed from one or more input ports of the first WSS to a working output port of the first WSS, to a protecting configuration, in which said one or more channels or a subset thereof are routed from said one or more input ports of the first WS S to a protecting output port of the first WSS, or switching from the protecting configuration to the working configuration, wherein the working path is connected to the working output port of the first WSS and the protecting path is connected to the protecting output port of the first WSS. According to a third alternative, the method comprises by using the second WSS, switching from a working configuration, in which one or more channels are routed from a working input port of the second WSS to one or more output ports of the second WSS, to a protecting configuration, in which said one or more channels are routed from a protecting input port of the second WSS to said one or more output ports of the second WSS, or switching from the protecting configuration to the working configuration, wherein the working path is connected to the working input port of the second WSS and the protecting path is connected to the protecting input port of the second WSS.

Each of the first, second and third alternatives of the method can be performed without any other of the first, second and third alternatives. Further, each of the first and second alternatives can be performed in combination with the third alternative, respectively, without the other of the first and second alternatives.

According to an embodiment of the method, the one or more channels which are routed in the protecting configuration from the protecting input port of the second WSS to one or more output ports of the second WSS or which are routed in the protecting configuration to the protecting output port of the first WSS from one or more input ports of the first WSS are a subset of the channels which are routed in the working configuration from the working input port the second WSS to one or more output ports of the second WSS or which are routed in the working configuration to the working output port of the first WSS from one or more input ports of the first WSS.

According to one or more embodiments of the method, broadcasting is performed by using a phase array of the first WSS to direct one or more channels simultaneously to different output ports of the first WSS. Hence, instead of using an optical splitter the broadcasting can be performed by using the phase array of the first WSS which can simultaneously be used for switching in order to provide a reconfigurable routing or directing of individual channels to respectively desired output ports. Thus, the switching element of the WSS can be used to preform additional functions which allow avoiding the implementation of additional components.

According to one or more embodiments of the method the phase array is a reconfigurable phase array being additionally used for switching of WDM channels within the first WSS.

According to one or more embodiments of the method in the first and/or second WSS the switching between the working configuration and the protecting configuration is performed by using a switching element of this respective WSS, wherein the switching element being additionally usable for redirecting WDM channels within this respective WSS between separate ports of this respective WSS. Hence, the selection of the working path or the protecting path can be performed by the same element which is present in a conventional WSS and which is used for the multiplexing and/or de-multiplexing functionality.

According to one or more embodiments of the method the switching element is based on one of the following technologies: Liquid Crystal on Silicon (LCoS), Liquid Crystal (LC), Microelectromechanical Mirrors (MEMS).

BRIEF DESCRIPTION OF THE DRAWINGS

Further details and advantages of the present invention will become apparent from the following description, in which preferred embodiments are described in detail with reference to the appended drawings, in which:

FIG. 1 shows a state-of-the-art optical WDM network with protection,

FIGS. 2a-2e show different embodiments of optical WDM networks with protection according to the invention.

In the drawings same elements are designated with same reference numbers.

DETAILED DESCRIPTION OF PREFERRED EMBODIMENTS

Figure 2B:
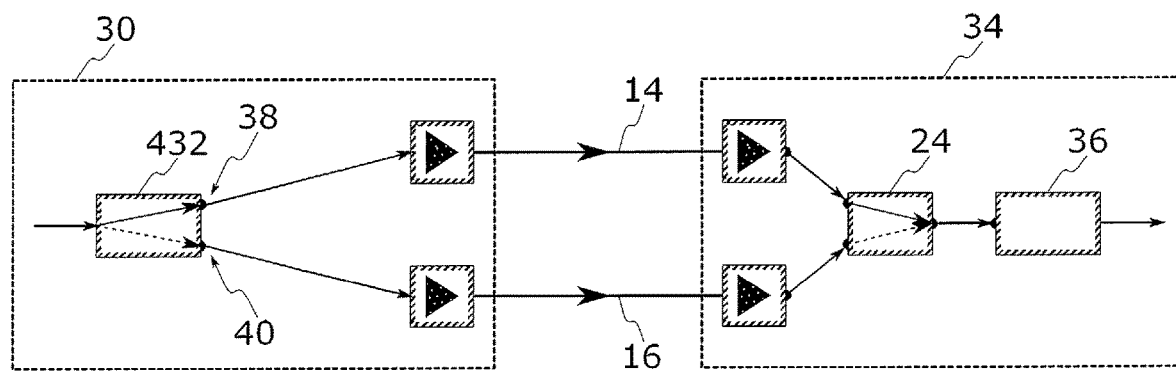

With reference to FIG. 2a, an optical network according to a first embodiment of the present invention is shown comprising a first node 30 with a first WSS 32 and a second node 34 with a second WSS 36. The first node 30 and the second node 34 are connected by a working path 14 and a separate protecting path 16. The second node 34 comprises an optical switch 24 and may correspond to the second ROADM 12 of the state of the art optical network shown in FIG. 1. The first node 30 differs from the first ROADM 10 of the optical network of FIG. 1 in that it does not comprise an optical splitter 22 behind the first WSS 32. Unlike the first WSS 18 of FIG. 1, the first WSS 32 of the optical network shown in FIG. 2a is used for broadcasting one or more channels or a subset thereof of one or more WDM-signals received at one or more input ports of the first WSS 32 both to a working output port 38 and to a separate protecting output port 40 of the first WSS 32.

For simplicity, only one input port and two output ports 38 and 40 are shown for the first WSS 32 in FIG. 2a. However, the first WSS 32 may comprise plural input ports and additional output ports and may correspond to the N×M WSS 332 shown in FIG. 3, wherein N is equal to 7 and designates the number of input ports and wherein M is equal to 4 and designates the number of output ports.

Figure 3:
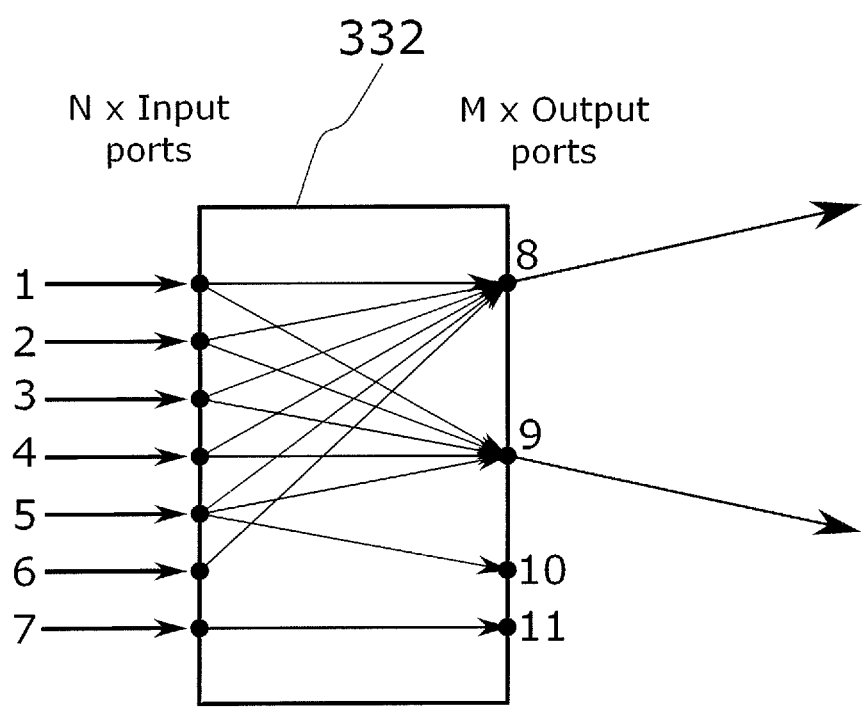
FIG. 3 shows an N×M WSS, which can be used for the present invention.

As shown in FIG. 3, the WSS 332 may receive seven separate WDM input signals at the left side at respective input ports 1-7 and may provide four separate WDM output signals at respective output ports 8-11. The WSS 332 is based on LC or LCoS, such that the phase array or refractive switching element provides a broadcasting function. The broadcasting function is illustrated in FIG. 3: As shown, from each of the WDM signals which arrive at input ports 1-5 at least one channel is transmitted or broadcasted to each of the output ports 8 and 9. The output port with number 8 may correspond to a working output port, such as working output port 38 in FIG. 2a, and the output port with number 9 may correspond to a protecting output port, such as protecting output port 40 of FIG. 2a.

In the configuration of FIG. 3, the channels arriving at input port with number 6 or a subset thereof are only switched to the working output port with number 8 such that these channels are not protected in the configuration shown in FIG. 3. As a result, only a subset of channels arriving at ports with numbers 1-6 are protected.

Further, it is possible that only a subset of channels or wavelengths which arrive at each of input ports 1-4 are broadcasted to both output ports with the numbers 8 and 9 and that one or more of the remaining channels are switched to the port with number 8 only. Hence, in this configuration more channels are output at the port with number 8 than at the port with number 9, such that also in this configuration only a subset of channels is protected.

If compared with the optical network of FIG. 1, the optical network of FIG. 2a provides some advantages:

The first WSS 32 replaces two components, namely the first WSS 18 and the optical splitter 22 of the network of FIG. 1. This allows for the use of fewer components which is more efficient and less costly. In conventional optical networks, often not all ports of the implemented WSS are used. The present invention makes use of such additional output ports (or input ports as explained further below) for providing protection. By using components and resources, namely an WSS and its ports, which have been available but not used so far for a replacement of an optical splitter for providing protection, the remaining network components can be utilized more effectively and the network can be implemented with reduced costs.

A further advantage is, that the WSS 32 or 332 allows for a more flexible switching. For example, it becomes possible to protect a subset of channels only. This is not readily possible, when using a splitter 22 which provides a copy of identical signals at its output. Since a WSS is reconfigurable and can be reconfigured to a different switching configuration, it is possible to adapt or reconfigure the protection according to an actual demand. If, for example, additional channels of one or more input ports, which have not been protected so far, should be protected, it is possible to reconfigure the WSS to a new configuration in which these channels are broadcasted to both the working output port 38 and the protecting output port 40. If some of the protected channels do not need to be protected anymore, the configuration can be changed again, to replace remove these channels are from the protecting port 40 while these channels can still be transmitted via the working port 38. Thus the protection of channels can be adapted quite easily. This flexibility of protection is not provided by the network of FIG. 1.

Referring to FIG. 2b, a further embodiment of an optical network according to the present invention is shown which is modified with respect to the optical network of FIG. 2a in that the first WSS 32 is replaced by first WSS 432. In order to provide protection, the first WSS 432 does not broadcast one or more channels to each of its working output port 38 and its protecting output port 40. Instead, one of these output ports 38 and 40 is selected based on predefined configuration information. The predefined configuration information is stored on a computer readable medium (not shown) and allows that the WSS 432 can be controlled by a control unit not shown) to be in a working configuration or in a protecting configuration.

In the working configuration channels of one or more incoming WDM signals are switched to the working output port 38 and transmitted via the working path 14 to the second node 34. In the working configuration these channels are not transmitted simultaneously to the protecting output port 40 and therefore not transmitted via the protecting path 16. In case of a protection event, the control unit (not shown) can change the configuration of the WSS 432 to the protecting configuration based on the predefined configuration information. In the protecting configuration the channels which have been transmitted via the working path 14 or a subset thereof are switched to the protecting output port 40 and transmitted via the protecting path 16 instead. Hence, in the optical network of FIG. 2b, the first WSS 432 can take over the function of a conventional WSS combined with an optical splitter, and can therefore provide for a more efficient and flexible protection at reduced costs.

Also this kind of protection, which is provided in the network of FIG. 2b and which makes use of the switching capability of the WSS 432, is quite flexible, since it is possible to define, for which channels of which input ports the routing has to be changed, if the transmission via the working path 14 is interrupted. The WSS 432 allows adapting and reconfiguring the protection for different channels and for different ports independently. This is not possible with an optical switch, which is not wavelength selective. In FIG. 2b the channel protection is provided by the switching capability of the WSS 432, by the two different separate output ports 38, 40 and by the predefined configuration information, which defines the protecting configuration and which therefore defines, which channels are transmitted via the protecting path 16, when switching to the protecting configuration. Hence, the protection can be reconfigured by a modification of the predefined configuration information. Further, it is possible to implements different protection schemes by providing corresponding configuration information for each protection scheme.

Networks according to other embodiments of the present invention, which are not shown, differ from the network of FIG. 2a or from the network of FIG. 2b, in that the optical switch 24 in the second node 34 is replaced by a variable optical power combiner. Likewise to the optical switch 24, this is an additional component, which is not wavelength selective. However, it provides more flexibility, since the optical power which is forwarded or selected from the working path 14 and/or the protecting path 16 can be adjusted.

Figure 2C:
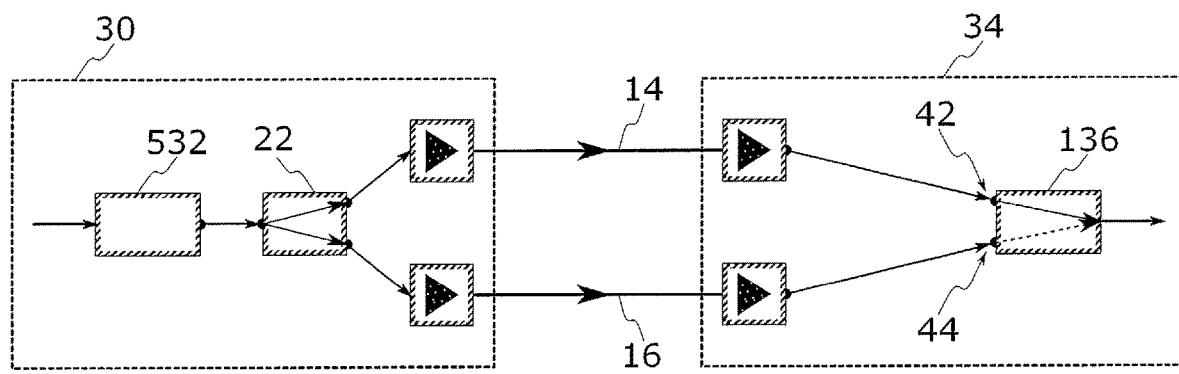

A further embodiment of an optical network according to the invention is shown in FIG. 2c. In this network, the first node 30 may correspond to the ROADM 10 of the state of the art network shown in FIG. 1. The first node 30 comprises a first WSS 532 which may correspond to the first WSS 18 of the network shown in FIG. 1. The second node 34 comprises a second WSS 136 which is complimentary to the first WSS 432 of the network shown in FIG. 2b. The second WSS 136 combines the functions of the optical splitter 24 and the second WSS 20 of the network of FIG. 1. Similar to the WSS 432, the second WSS 136 can be controlled by a corresponding control unit to be in a working configuration or to be in a protecting configuration based on predefined configuration information. In the working configuration, one or more channels arriving at a working input port 42, which is connected to the working path 14, are routed to one or more output ports of the second WSS 136. In the working configuration identical channels or wavelengths, which arrive via the protecting path 16 at a protecting input port 44 of the second WSS 136, are not routed to the before-mentioned output ports. However, in case of a protection event, the second WSS 136 is controlled out of a working configuration into a protecting configuration, in which these channels or a subset thereof, which arrive at the protecting input port 44 are routed to one or more of the before-mentioned output ports.

Networks according to further embodiments of the present invention, which are not shown, differ from the network of FIG. 2c, in that the optical splitter 22 in the first node 30 is replaced by a variable optical power splitter. Likewise to the optical splitter 22, this is an additional component, which is not wavelength selective. However, it provides more flexibility, since the optical power which is transmitted into the working path 14 and/or the protecting path 16 can be adjusted.

Figure 2D:
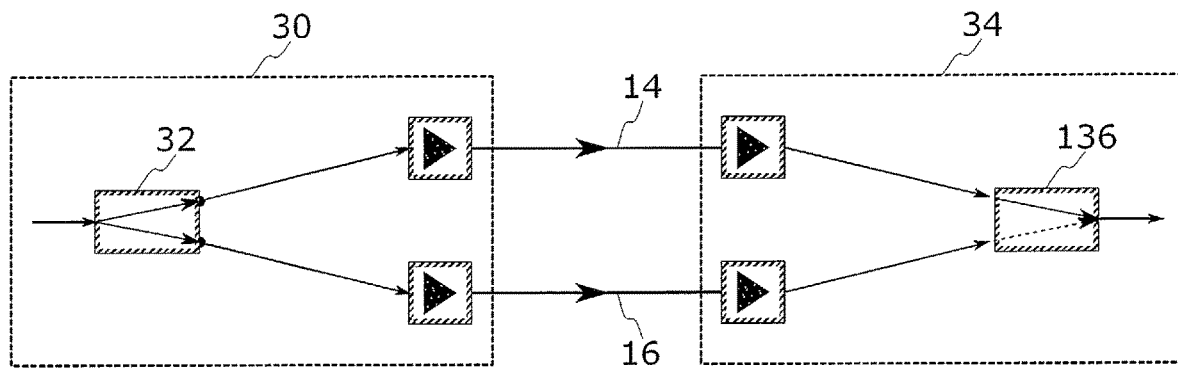

Referring to FIG. 2d, a further embodiment of a network according to the invention is shown. This network comprises a first node 30 with a first WSS 32 which has been described with respect to FIG. 1 and a second node 34 with a second WSS 136 which has been described with respect to FIG. 2c. Hence, in this network, in each of the first and second nodes 30 and 34 the additional optical components of an optical splitter 22 and an optical switch 24 are replaced by the first WSS 32 and by the second WSS 136, respectively. This allows for a further cost reduction and flexibility.

Figure 2E:
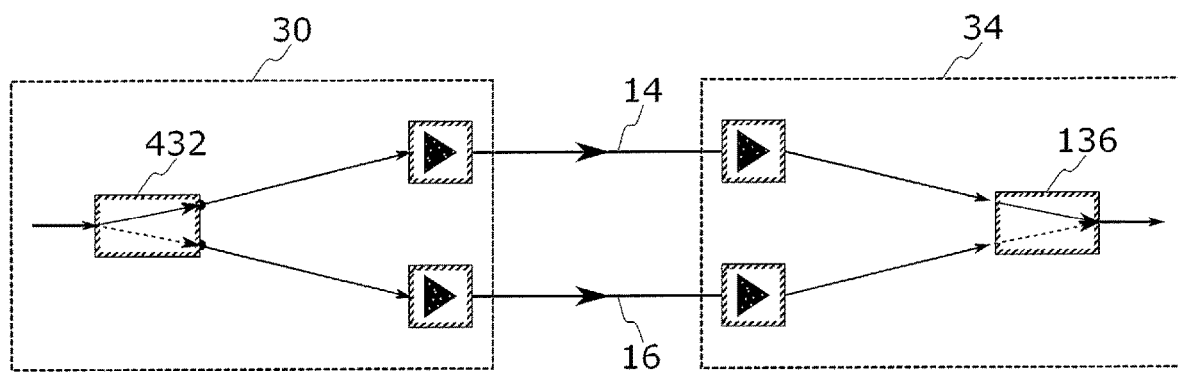

Referring to FIG. 2e, a further embodiment of an optical network, according to the invention is shown, which is modified with respect to the optical network of FIG. 2d in that the first WSS 32 is replaced by the WSS 432, which has been described with respect to FIG. 2b. Also in this network, at both ends of the working path 14 and the protecting path 16, namely in the first node 30 and in the second node 34, the additional optical components of an optical splitter 22 and an optical switch 24 are replaced by the first WSS 432 and by the second 136, respectively.

Figure 4:
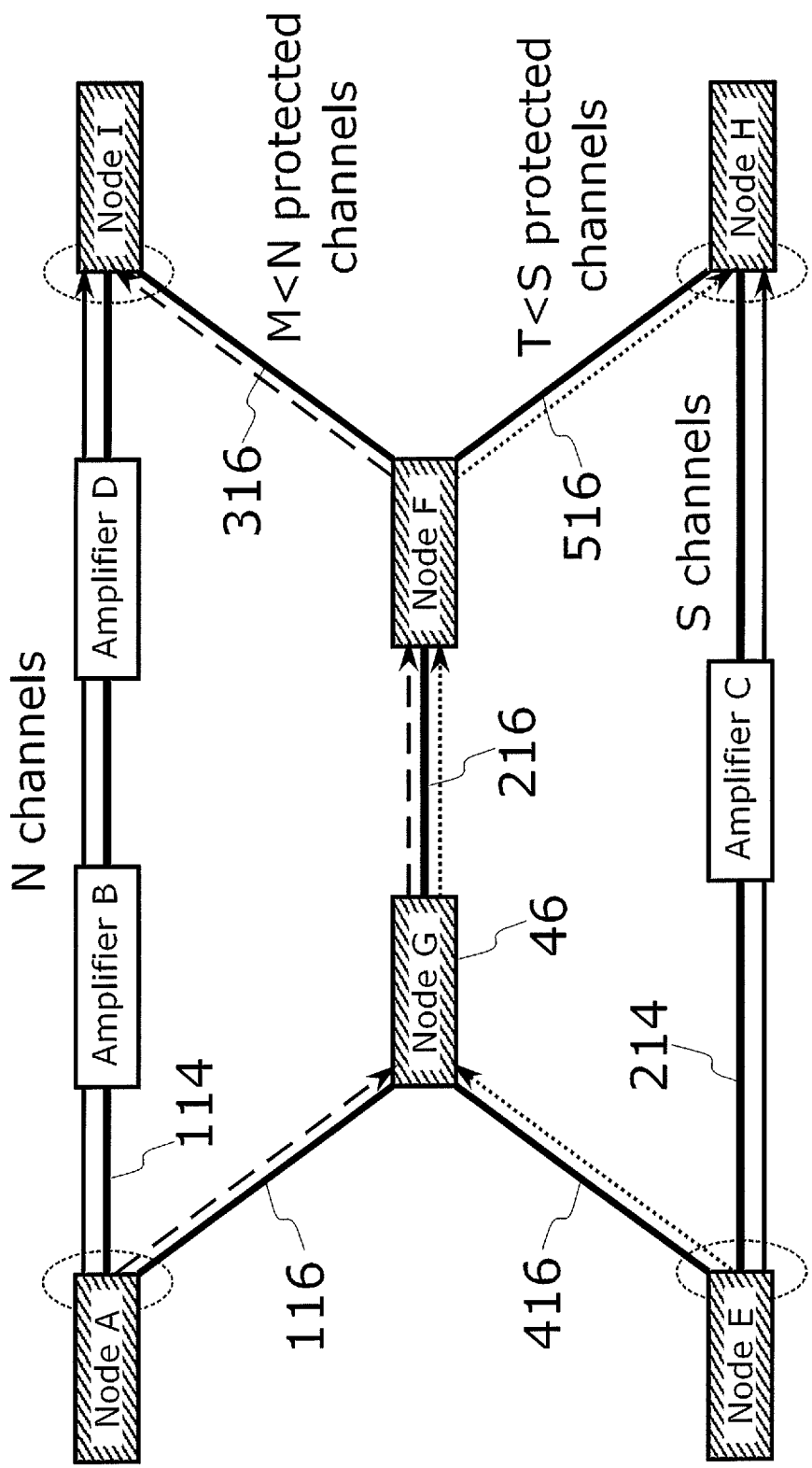
FIG. 4 shows an optical WDM network according to a further embodiment of the present invention.

With reference to FIG. 4 an optical WDM network is shown, which makes use of the present invention and provides path protection. The optical network comprises six nodes A, E, F, G, H and I. Nodes A and I are connected by a working path 114 which comprises amplifiers B and D. Nodes E and H are connected by a separate working path 214, which comprises an amplifier C. Nodes A and I are additionally connected by a protecting path which comprises protecting path sections 116, 216 and 316 as well as nodes G and F. Nodes G and F are directly connected by the protecting path section 216. Nodes E and H are additionally connected by a protecting path comprising a protecting path section 416, the protection path section 216, a protecting path section 516 as well as nodes G and F. Nodes A and G are directly connected by the protecting path section 116, nodes F and I are directly connected by the protecting path section 316, nodes E and G are directly connected by the protecting path section 416 and nodes F and H are directly connected by the protecting path section 516. The protecting path section 216 is used both for the protection of working path 114 and of working path 214, while the protecting path sections 116, 316, 416 and 516 are not shared by different working paths.

At least one of the nodes A and I and at least one of the nodes E and H may comprise a WSS which takes over the functionality of an additional optical switch or an additional optical splitter as previously described. Accordingly, it is possible that the channels, which are protected by the protection path between nodes A and I are a subset of the channels which are transmitted via the working path 114. Similarly, the channels which are protected by the protection path between nodes E and H may be a subset of the channels which are transmitted via the working path 214 between nodes E and H.

In FIG. 4 the signal transmission is only shown for one direction from left to right. However, it is possible that each path or section 114, 214, 116, 216, 316, 416, 516 is used for a bidirectional communication in two opposite directions, for example, by using between two nodes for each communication direction a corresponding optical fiber.

Figure 5:
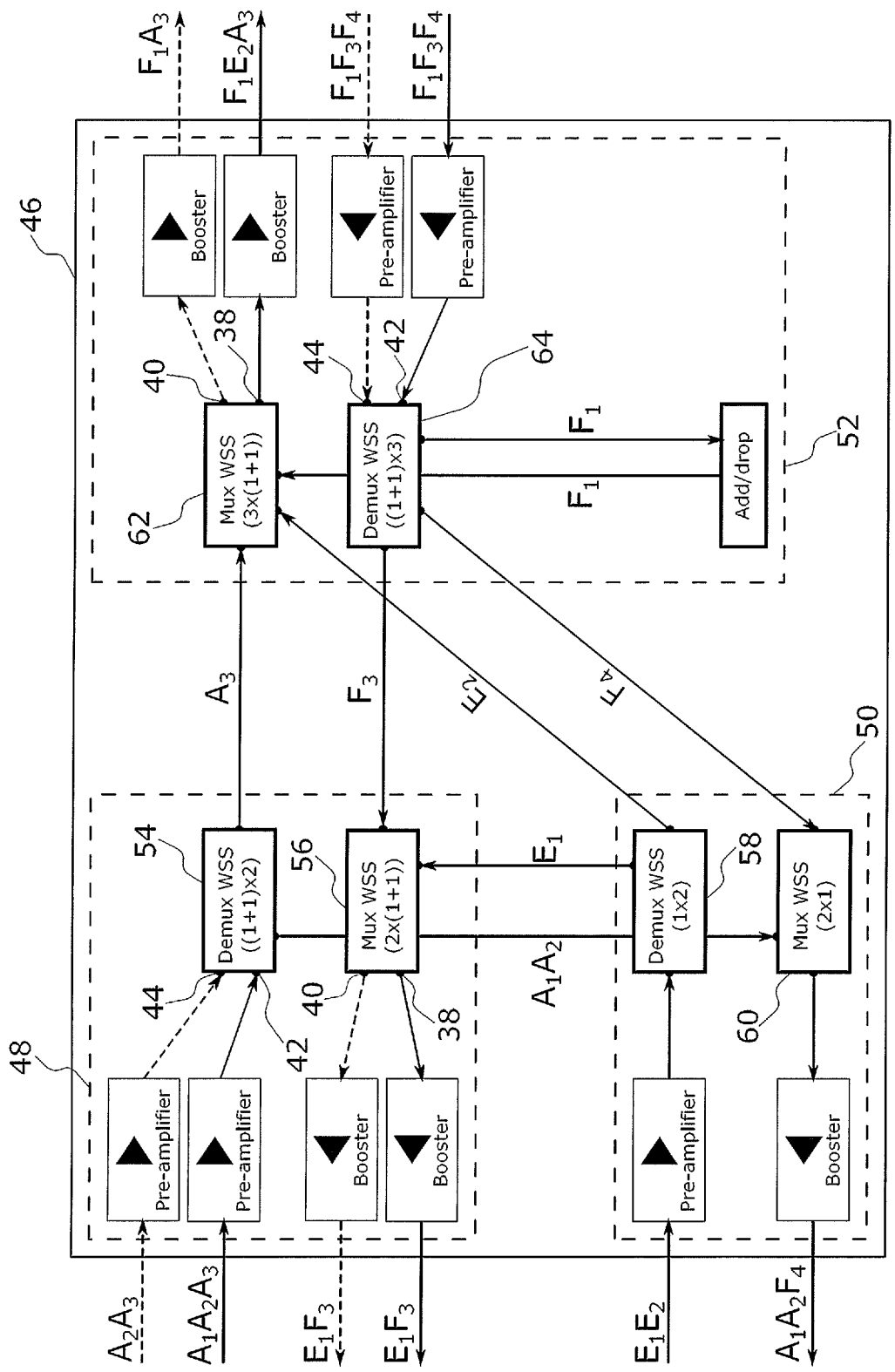
FIG. 5 shows a node which can be used for the present invention and which may correspond to node G of FIG. 4.

In FIG. 5 an optical node 46 is shown which may correspond to node G of FIG. 4 and which allows providing protection for the transmission or communication between nodes A and G and for the transmission or communication between nodes G and F.

The node 46 comprises a first ROADM 48, a second ROADM 50 and a third ROADM 52. Each of the ROADMs 48, 50, 52 comprises two WSS, namely WSS 54 and 56, WSS 58 and 60 and WSS 62 and 64, respectively, as shown in FIG. 5. The WSS 54, 58, 64 are demultiplexing WSS. WSS 54 is configured to de-multiplex an incoming WDM signal which is transmitted from node A. WSS 58 is configured to de-multiplex an incoming WDM signal which is transmitted from node E. WSS 64 is configured to de-multiplex an incoming WDM signal which is transmitted from node F. In FIG. 5 WDM signals are designated by $X_iY_j$, wherein the indices i, j designate the channel or wavelength and X, Y designate the node, from which the information, which is conveyed by the corresponding channel, has been sent to node G 46 (cf. FIG. 4). The WDM signal $A_1A_2F_4$, for example, includes information on channels 1 and 2, which has been sent from node A to node 46, and includes information on channel 4, which has been sent from node F to node 46, but does not contain any information on channel 3. As mentioned before, each channel is a wavelength channel and corresponds to an associated wavelength or wavelength range. Both the information carried on WDM signal $A_1$ and carried on WDM signal $A_2$ was sent from the same node A but on different channels and must not be identical. Instead, this information may correspond to different information.

Each of the WSS 56 and 62 comprises a working output port 38 and a protecting output port 40. The WSS 56 can be used to provide protection for transmission from node G 46 to node A and the WSS 62 can be used to provide protection for transmission from node G 46 to node, as explained above with respect to the WSS 32 and with respect to WSS 432 of FIG. 2. In order to provide protection each of the WSS 56 and 62 may correspond to WSS 32 with broadcasting capability or to WSS 432, i.e. being configured to be controlled into one of a working configuration and a protecting configuration. Hence, this protection between node 46 and node A and between node 46 and node F can be provided without using additional optical splitters or optical switches behind WSS 56 within node 46 and behind WSS 62 within node 46 and without using additional optical splitters or optical switches between node 46 and node A and between node 46 and node F.

WSS 54 and WSS 64 each comprise a working input port 42 and a protecting input port 44. These WSS 54 and 64 may correspond to WSS 136 of FIG. 2 and are capable of providing protection for transmission from node A to node G and for transmission from node F to node G, respectively, without need for an additional optical switch before WSS 54 within node 46 and before WSS 64 within node 46, respectively.

Different from the respective WSS in ROADMs 58 and 52, the WSS 58 of ROADM 50 comprises only one input port and WSS 60 of ROADM 50 comprises only one output port. Accordingly, these WSS 58 and 60 are not capable of providing protection for communication between nodes E and G without use of additional optical switches and/or additional optical splitters.

FIG. 5 further illustrates that for the communication from node A to node 46 and from node 46 to node F only a subset of channels is protected, while for the communication from node 46 to node A (on channels 1 and 3) and for the communication from node F to node 46 (on channels 1, 3 and 4) all channels are protected. The normal communication, i.e. the "working" communication, from node A to node 46 utilizes channels 1, 2 and 3 while only channels 2 and 3 are protected. The normal communication from node 46 to node F utilizes channels 1, 2 and 3 while only channels 1 and 3 are protected.

It is noted, that the protection between node 46 and node A and the protection between node 46 and node F, as explained with respect to FIG. 5 and FIG. 4, corresponds to an "additional protection", i.e. in addition to the before mentioned protection of the working path 114 provided by the protecting path sections 116, 216, 316 and in addition to the before mentioned protection of the working path 214 provided by the protecting path sections 416, 216, 516.

While specific embodiments have been described in detail, it is not intended that the scope of protection is limited by the specific embodiments. The scope of protection is defined by the appended claims.

LIST OF REFERENCE SIGNS 10 first ROADM
12 second ROADM
14, 114, 214 working path
16 protecting path
116, 216, 316, 416, 516 protecting path sections
18 first WSS
20 second WSS
22 optical splitter
24 optical switch
26 booster
28 pre-amplifier
30 first node
32, 432, 532 first WSS
34 second node
36, 136 second WSS
38 working output port
40 protecting output port
42 working input port
44 protecting input port
46 node
48 first ROADM
50 second ROADM
52 third ROADM
54, 56, 58, 60, 62, 64 WSS

The invention claimed is:

1. An optical network element for path-protected communication of wavelength division multiplexing (WDM) signals within a WDM network using a working path and a protection path that each communicatively connect to the optical network element, the optical network element comprising:
 a wavelength selective switch (WSS) operable to enable the optical network element to at least one of add to a WDM signal at least one channel and drop from a WDM signal at least one channel,
  wherein the WSS comprises one or more input ports and a working output port communicatively connected to the working path, and a separate protecting output port communicatively connected to the protection path, the WSS being configurable to a working configuration, in which one or more channels are routed by the WSS from said one or more input ports to the working output port, and being configurable to a protecting configuration, in which at least one channel of said one or more channels is routed by the WSS from at least one of said one or more input ports to the protecting output port,
 a computer readable medium including program code defining configuration information,
 a control unit configured to control the WSS to adopt the working configuration or the protecting configuration based on the configuration information,
  wherein the optical network element is adapted to provide path-protected communication by using the WSS in the protecting configuration to route to the protection path said at least one channel of said one or more channels, without the optical network element routing said at least one channel to the protection path through an optical splitter of the optical network element that the WSS does not comprise, and without the optical network element routing said at least one channel to the protection path through an optical switch of the optical network element that the WSS does not comprise.

2. An optical network for path-protected communication of wavelength division mulitplexing (WDM) signals between nodes of the optical network using a working path and a protection path that each communicatively connect to a node of the optical network, the optical network comprising:
 a first node comprising a first wavelength selective switch WSS),
 a second node comprising a second WSS,
  wherein at least one of the first WSS and the second WSS is operable to enable the respective node that comprises the WSS under consideration to at least one of add to a WDM signal at least one channel and drop from a WDM signal at least one channel,
  wherein the first WSS and the second WSS are adapted to communicatively connect with one another via each of the working path and the protecting path,
  wherein the working path is communicatively connected to a working output port of the first WSS and the protecting path is communicatively connected to a separate protecting output port of the first WSS, the first WSS being configurable to a working configuration, in which one or more channels are routed by the first WSS from one or more input ports of the first WSS to the working output port of the first WSS, and being configurable to a protecting configuration, in which at least one channel of said one or more channels or a is routed by the first WSS from at least one of said one or more input ports of the first WSS to the protecting output port of the first WSS, the optical network further comprising
   a control unit configured to control the first WSS in alternating between the working configuration and the protecting configuration based on configuration information defined by program code in a computer readable medium,
  and
  wherein the working path is communicatively connected to a working input port of the second WSS and the protecting path is communicatively connected to a separate protecting input port of the second WSS, the second WSS being configurable to a working configuration, in which one or more channels are routed by the second WSS from the working input port to one or more output ports of the second WSS, and being configurable to a protecting configuration, in which said at least one channel is routed by the second WSS from the protecting input port to at least one of said one or more output ports of the second WSS, the optical network further comprising
   a control unit configured to control the second WSS in alternating between the working configuration and the protecting configuration based on configuration information defined by program code in a computer readable medium;
  and
  wherein the first node and the second node are adapted to provide path-protected communication between the first node and the second node by using the first WSS in the protecting configuration of the first WSS, and by also using the second WSS in the protecting configuration of the second WSS, to communicate said at least one channel over the protection path from the first WSS to the second WSS wherein at least one of the first node and the second node provide such path-protected communication from the first node and the second node without the node under consideration routing said at least one channel through an optical splitter of the node under consideration that the WSS of the node under consideration does not comprise, and without the node under consideration routing said at least one channel through an optical switch of the node under consideration that the WSS of the node under consideration does not comprise.

3. The optical network element of claim 1, wherein when in the working configuration the WSS is configured to prohibit a routing of a channel to its protecting output port from its one or more input ports and when in the protecting configuration the WSS is configured to prohibit a routing of a channel to its working output port from its one or more input ports.

4. The optical network of claim 2, wherein one of the first node and the second node comprises a reconfigurable optical add-drop multiplexer (ROADM), and another of the first node and the second node comprises an optical add-drop multiplexer (OADM).

5. The optical network of claim 2, wherein at least one of the first WSS and the second WSS comprises a switching element based on a technology selected from a group consisting of Liquid Crystal on Silicon (LCoS), Liquid Crystal (LC), and Microelectromechanical Mirrors (MEMS).

6. The optical network of claim 2, wherein at least one of the first WSS and the second WSS comprises a reconfigurable phase array.

7. The optical network of claim 2, wherein the first WSS comprises a N×M WSS wherein N≥1 and M≥2, and the second WSS comprises a K×L WSS wherein K≥2 and L≥1.

8. A method for path-protected communication of WDM signals between nodes in an optical network using a working path and a protection path that each communicatively connect to a node of the optical network, the optical network comprising:
a first node comprising a first wavelength selective switch (WSS),
a second node comprising a second WSS,
wherein at least one of the first WSS and the second WSS is operable to enable the respective node that comprises the WSS under consideration to at least one of add to a WDM signal at least one channel and drop from a WDM signal at least one channel,
wherein the first WSS and the second WSS are communicatively connected via at least one of the a working path and the protecting path,
wherein the method comprises:
by using the first WSS, switching in a first circumstance from a working configuration, in which one or more channels are routed by the first WSS from one or more input ports of the first WSS to a working output port of the first WSS, to a protecting configuration, in which at least one channel of said one or more channels is routed by the first WSS from at least one of said one or more input ports of the first WSS to a protecting output port of the first WSS, and switching in a second circumstance from the protecting configuration to the working configuration,
and by using the second WSS, switching in the first circumstance from a working configuration, in which one or more channels are routed by the second WSS from a working input port of the second WSS to one or more output ports of the second WSS, to a protecting configuration, in which the at least one channel is routed by the second WSS from a protecting input port of the second WSS to at least one of said one or more output ports of the second WSS, and switching in the second circumstance from the protecting configuration to the working configuration; and
wherein the first node and the second node are adapted to provide path-protected communication between the first node and the second node by using the first WSS in the protecting configuration of the first WSS, and by also using the second WSS in the protecting configuration of the second WSS, to communicate said at least one channel, over the protection path from the first WSS to the second WSS, wherein at least one of the first node and the second node provide such path-protected communication from the first node and the second node without the node under consideration routing said at least one channel through an optical splitter of the node under consideration that the WSS of the node under consideration does not comprise, and without the node under consideration routing said at least one channel through an optical switch of the node under consideration that the WSS of the node under consideration does not comprise.

9. The method of claim 8, wherein the first WSS comprises a phase array that is adapted in at least the protecting configuration to broadcast one or more channels simultaneously to different output ports of the first WSS.

10. The method of claim 9, wherein the phase array comprises a reconfigurable phase array used for switching of WDM channels within the first WSS.

11. The method of claim 8, wherein each of the first WSS and second WSS comprises a switching element that is adapted to switch between the working configuration and the protecting configuration of the WSS under consideration, wherein the switching element is also adapted to redirect WDM channels to at least one of add to a WDM signal at least one channel and drop from a WDM signal at least one channel.

12. The method of claim 11, wherein the switching element is based on a technology selected from a group consisting of: Liquid Crystal on Silicon (LCoS), Liquid Crystal (LC), and Microelectromechanical Mirrors (MEMS).

13. The optical network of claim 2, wherein the first WSS is operable to enable the first node to at least one of add to a WDM signal at least one optical signal and drop from a WDM signal at least one optical signal, and wherein when in the working configuration the first WSS is configured to prohibit a routing of a channel to its protecting output port from one or more of its one or more input ports and when in the protecting configuration the first WSS is configured to prohibit a routing of a channel to its working output port from one or more of its one or more input ports.

14. The optical network of claim 8, wherein at least one of the first node and the second node comprises a reconfigurable optical add-drop multiplexer (ROADM), another of the first node and the second node comprises an optical add-drop multiplexer (OADM).

15. The optical network of claim 2, wherein at least one of the first WSS and the second WSS comprises a switching element based on a technology selected from a group consisting of Liquid Crystal on Silicon (LCoS), Liquid Crystal (LC), and Microelectromechanical Mirrors (MEMS).

16. The optical network of claim 2, wherein at least one of the first WSS and the second WSS comprises a reconfigurable phase array.

17. The optical network of claim 2, wherein the first WSS comprises a N×M WSS wherein N≥1 and M≥2, and the second WSS comprises a K×L WSS wherein K≥2 and L≥1.

18. An optical network element for path-protected communication of wavelength division multiplexing (WDM) signals within a WDM network using a working path and a protection path that each communicatively connect to the optical network element, the optical network element comprising:
   a wavelength selective switch (WSS) operable to enable the optical network element to at least one of add to a WDM signal at least one channel and drop from a WDM signal at least one channel,
   wherein the WSS comprises a working input port communicatively connected to the working path, a protecting input port communicatively connected to the protection path, and one or more output ports, the WSS being configurable to a working configuration, in which one or more channels are routed by the WSS from the working input port to one or more of the one or more output ports, and being configurable to a protecting configuration, in which at least one channel received by the optical network element from the protection path is routed by the WSS from the protecting input port to at least one of the one or more output ports,
   wherein the optical network element is adapted to provide path-protected communication by using the WSS in the protecting configuration to route the at least one channel to the at least one of the one or more output ports, without the optical network element routing to the WSS the at least one channel through an optical splitter of the optical network element that the WSS does not comprise, and without the optical network element routing to the WSS the at least one channel through an optical switch of the optical network element that the WSS does not comprise.

19. The optical network element of claim 18, wherein the WSS comprises a N×M WSS wherein N≥1 and M≥2, and wherein the WSS comprises a switching element based on a technology selected from a group consisting of Liquid Crystal on Silicon (LCoS), Liquid Crystal (LC), and Microelectromechanical Mirrors (MEMS).

20. The optical network element of claim 1, wherein the WSS comprises a N×M WSS wherein N≥1 and M≥2, and wherein the WSS comprises a switching element based on a technology selected from a group consisting of Liquid Crystal on Silicon (LCoS), Liquid Crystal (LC), and Microelectromechanical Mirrors (MEMS).

* * * * *